Aug. 4, 1970     R. A. MAHAFFY     3,522,687
SINGLE-CHAMBER PACKAGING MACHINE FOR SEMI-RIGID PACKAGES
Filed Jan. 14, 1969     3 Sheets-Sheet 1
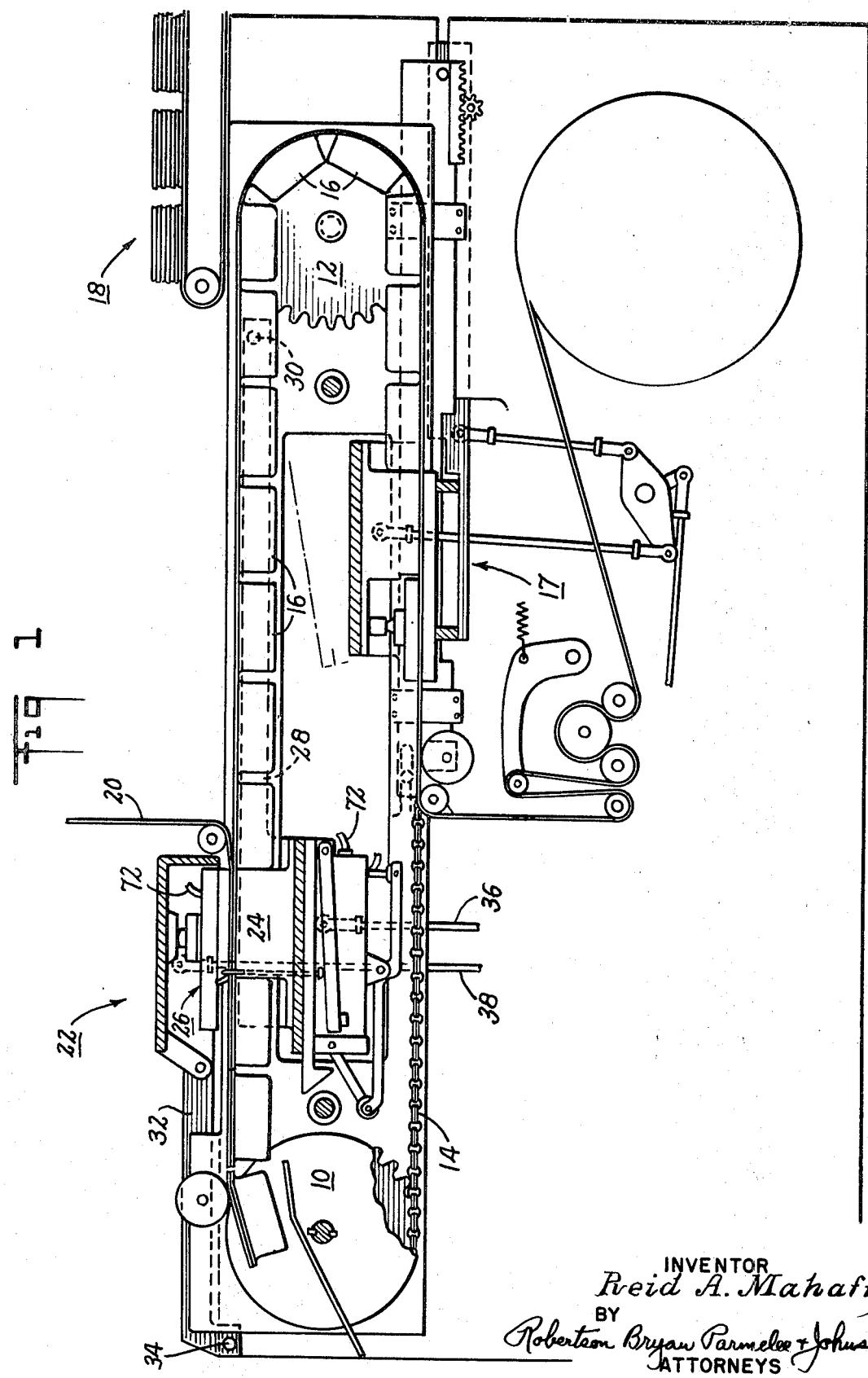
INVENTOR
Reid A. Mahaffy
BY
Robertson Bryan Parmelee + Johnson
ATTORNEYS

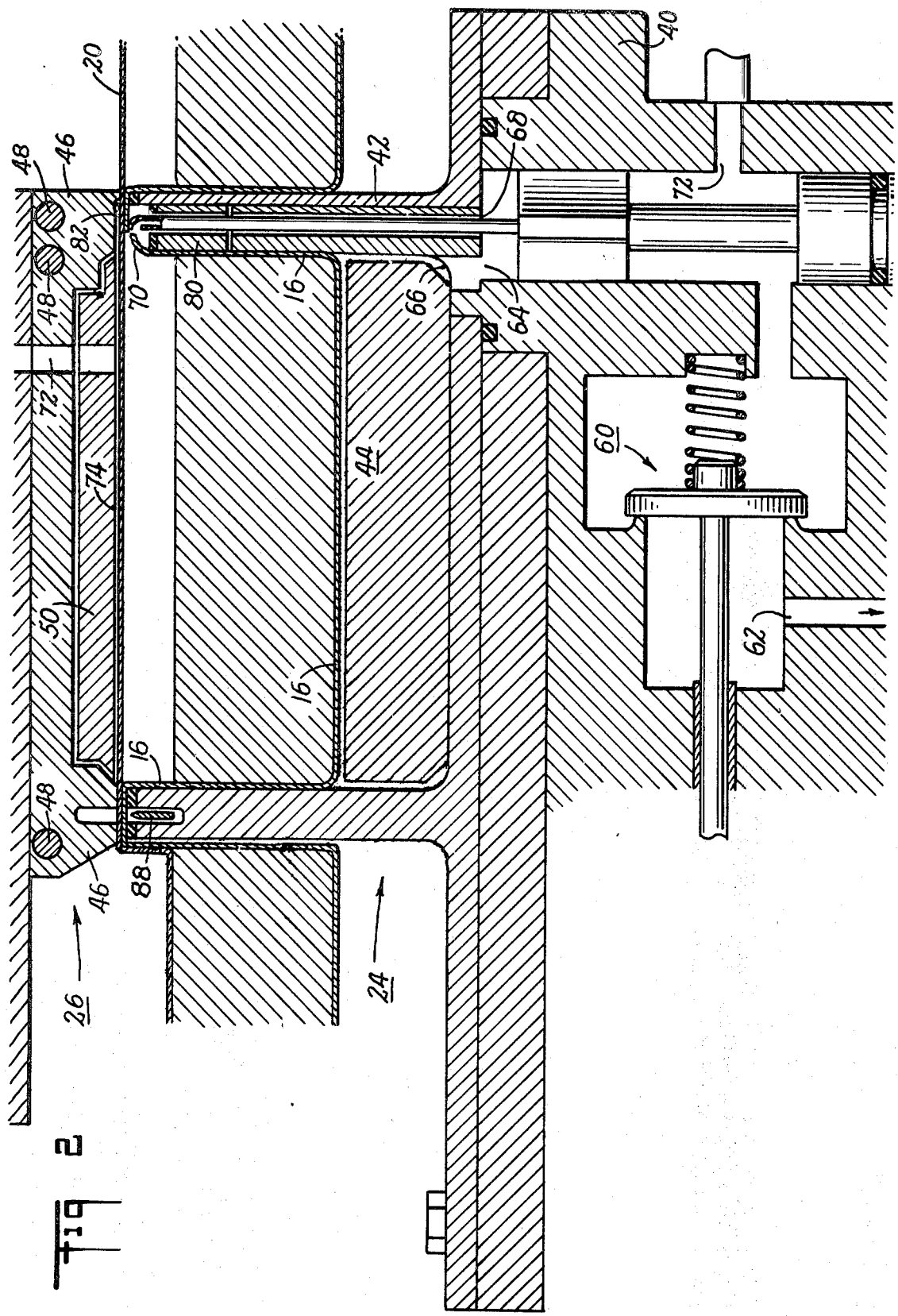

Aug. 4, 1970 R. A. MAHAFFY 3,522,687
SINGLE-CHAMBER PACKAGING MACHINE FOR SEMI-RIGID PACKAGES
Filed Jan. 14, 1969
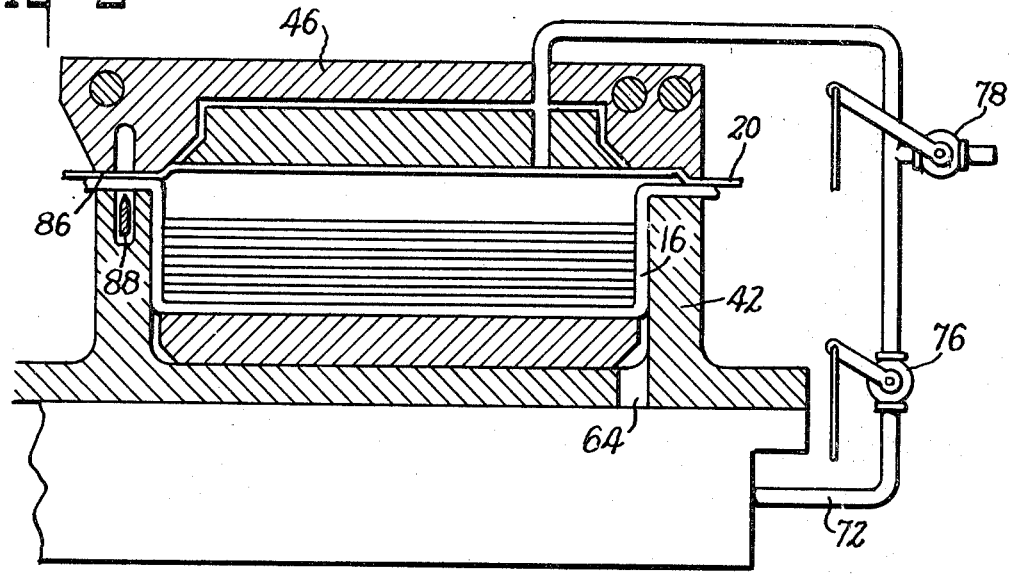
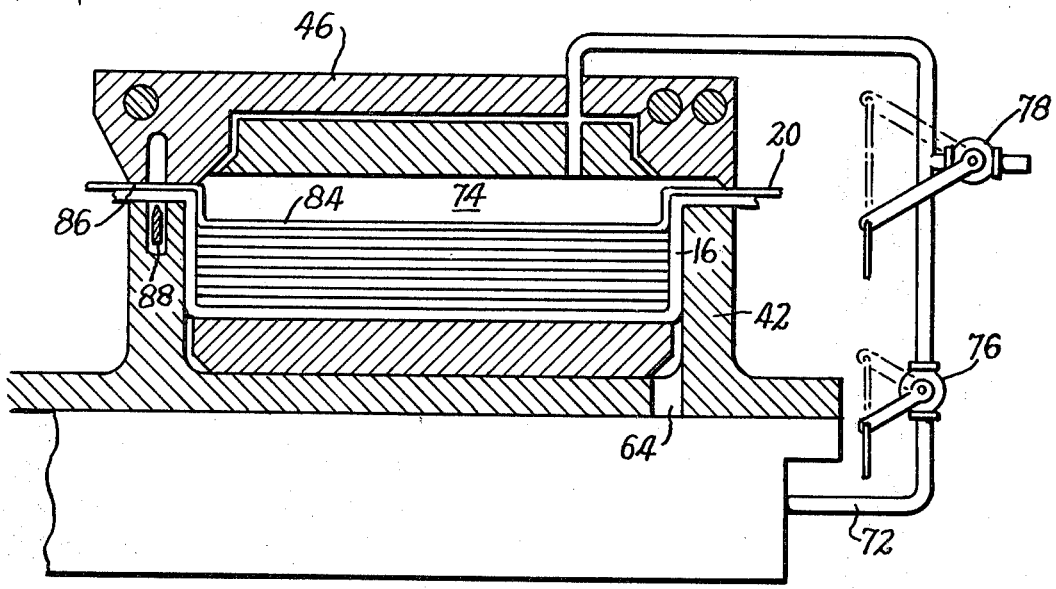

United States Patent Office 3,522,687
Patented Aug. 4, 1970

3,522,687
SINGLE-CHAMBER PACKAGING MACHINE FOR
SEMI-RIGID PACKAGES
Reid A. Mahaffy, Montclair, N.J., assignor to Mahaffy
& Harder Engineering Company, Totowa, N.J.
Filed Jan. 14, 1969, Ser. No. 790,915
Int. Cl. B65b 31/02
U.S. Cl. 53—22                                     10 Claims

ABSTRACT OF THE DISCLOSURE

Packaging apparatus of the type comprising a die adapted to receive a plastic cup-shaped container having sealing surfaces extending around the mouth thereof, a clamp cooperable with the die to form a single closed chamber within which a package may be completed by heat sealing a top to the container while simultaneously evacuating the package; and heater means supported on the clamp to apply heat to the marginal portions of the plastic top immediately inboard of the seal line to soften the plastic in those marginal portions and render it readily stretchable, whereby, upon venting, atmospheric pressure forces the central portion of the plastic sheet inwardly against the product and the marginal portions are stretched substantially.

---

This invention relates to vacuum packaging techniques. More particularly, this invention relates to methods and apparatus for automatically forming packages of the semi-rigid type wherein the package comprises a cup-shaped container of semi-rigid plastic material and the top is stretching. Thereafter, the tray carrying the cup with The portions of the plastic top which extend down along the side walls of the cup are stretched beyond their effective elastic limit, and the net inward force of atmospheric pressure is borne by the packaged articles so that the semi-rigid cup is not significantly distorted.

A method of producing such a package is described in detail in co-pending application Ser. No. 484,249, filed by W. E. Young and R. A. Mahaffy on Sept. 1, 1965. As outlined in that application, a semi-rigid container loaded with articles to be packaged is placed in a first chamber where a plastic top is sealed to the container around the peripheral margins; while in that chamber, the top is heated to soften it for subsequent stretching. Thereafter, the package is moved to a second chamber where the package is rapidly evacuated and completely sealed. When this second chamber is vented, atmospheric pressure stretches the previously heated plastic sheet into the container cup to engage the packaged articles.

The forming apparatus disclosed in that application comprises a series of trays carrying the semi-rigid cups beneath a two-stage packaging head adapted to cooperate with the trays to define "preliminary seal" and "final seal" chambers in which the package is formed as described hereinabove. In the chamber of the preliminary seal stage, vacuum is applied above the package top to draw it up into contact with a heater element which transfers heat to the plastic top material to soften it for subsequent stretching. Thereafter, the tray carrying the cup with the heated top is shifted to the final seal stage where evacuation of the package takes place, followed by sealing of the evacuation aperture. Upon venting of this second chamber to atmosphere, the softened plastic material of the top is stretched inwardly into the cup interior to engage the packaged articles, thereby to complete formation of the package.

In contrast to the above-described machine wherein the sealing and evacuation operations take place at two separate stations, the Schmidt Pat. 3,298,158 discloses a packaging machine wherein the sealing and evacuation is carried out at a single station, thus avoiding shifting of the package from a preliminary seal stage to a final seal stage. However, the specific machine shown in the Schmidt patent is, in effect, a two-chamber arrangement, wherein one chamber (for sealing) is located inside of a second chamber (for evacuating), and the two chambers are separately operated in a timed sequence.

In still another machine, disclosed in application Ser. No. 672,146, filed by Reid A. Mahaffy et al. on Oct. 2, 1967, now abandoned, there are three stages. In the first stage, the top sheet is drawn upwardly into contact with a heated element to heat the plastic and prepare it for stretching. In the second stage, the heated plastic is stretched upwardly (away from the package cup) to form the package top with the desired configuration. In the third or final stage, the top is depressed into the package cup and the final sealing and evacuation of the package is effected before venting.

It has been found that for certain applications and uses, the desired semi-rigid packages can be formed with a single-chamber machine, and thus the packaging apparatus can be of the type not requiring moving trays to hold the container cups as they are shifted through the various operating stations. An earlier version of one single-chamber machine is shown in co-pending application Ser. No. 526,081, filed by Joel A. Hamilton on Feb. 9, 1966. The machine of that application was not designed for making semi-rigid packages. One principal problem in making such packages is that of forming the plastic top. As described hereinbelow, semi-rigid packages can be produced on a packaging machine of the general type disclosed in application Ser. No. 526,081, by effecting certain modifications to the apparatus and techniques used.

Accordingly, it is an object of this invention to provide improved means and methods for producing semi-rigid packages. A more specific object of this invention is to provide a simplified arrangement and procedure for converting plastic sheet material into packages of the type comprising a semi-rigid cup and a formed top. Other objects, aspects, and advantages of the present invention will in part be apparent from, and in part pointed out in, the following description considered together with the accompanying drawings, in which:

FIG. 1 shows in elevation the basic operating elements of a machine of the type disclosed in the above identified copending application Ser. No. 526,081;

FIG. 2 is a vertical section showing details of the final sealing die provided with heating means for softening the top sheet of a semi-rigid package;

FIG. 3 shows how the plastic top sheet is pressed up against the heater element, during the initial stages of evacuation; and FIG. 4 shows the completed package subsequent to venting of the evacuation chamber.

Referring now to FIG. 1, the machine comprises two sets of rotatable end sprockets 10 and 12 adapted to receive a pair of endless side-by-side chains 14 for movement around parallel paths. The left-hand sprockets 10 are rotated by a conventional electric motor drive and indexing mechanism (not shown) to effect an intermittent indexing movement of the chains 14 for movement around parallel paths. These chains carry a series of semi-rigid cups 16 which are formed in a continuous sheet of semi-rigid plastic material clipped to the chains. Such cups may be produced by any suitable arrangement adapted for use with the heavy-gauge semi-rigid material, and may be pre-formed or may be formed as part of the sequential functioning of the packaging machine, as indicated diagrammatically at station 17 along the lower reaches of the chains. Since the method of cup formation is not related to the present invention, no detailed description will be included herein.

A conveyor 18 provides a series of products, such as stacks of luncheon meat, which are placed in the cups. Thereafter, a sheet 20 of plastic packaging material is applied over the cups to be formed subsequently into a top for the package. To this end, the cups are shifted into a package finishing station generally indicated at 22 and including a pair of oppositely-reciprocable members 24 and 26.

The lower member 24 is carried by a pair of longitudinal arms 28 pivotally connected at their remote ends 30 to the main machine frames. The upper member 26 similarly is carried by a pair of arms 32 pivotally connected at their remote ends 34 to the main machine frames. Vertical rods 36 and 38 are connected to members 24 and 26 respectively, and extend downwardly to a conventional operating mechanism (not shown) arranged to reciprocate these rods in opposite vertical directions in synchronism with the indexing movement of the cups.

Referring also to FIG. 2, the lower finishing station member 24 includes a base 40 and a sealing die 42 comprising four vertical walls and a floor (e.g. a conventional die filler block 44) defining an enclosure adapted to receive a loaded cup 16. The cup flanges, i.e. the sealing surfaces surrounding the cup mouth, rest on the upper pressure surfaces of the die walls.

The upper member 26 comprises a sealing clamp 46 having pressure surfaces arranged to engage the corresponding, aligned pressure surfaces of the die 42 to create a single air-tight chamber surrounding the semi-rigid cup. This sealing clamp 46 includes electric heater rods 48 which heat the metal of the clamp to such an extent that the clamp pressure surfaces, which engage the die 42, are maintained at a realtively high temperature. The heat from these pressure surfaces seals the top plastic sheet to the flange sealing surfaces surrounding the cup.

In accordance with one aspect of the present invention, the sealing clamp 46 also includes means adapted to apply a moderate amount of heat energy to the marginal portions of the plastic sheet 20 immediately inboard of the seal line running around the cup flanges. In the preferred embodiment, this feature is provided by a platen member 50 which receives heat from the rods 48 and thus is maintained at a moderately high temperature. This platen extends across the full area of the cup mouth, and is positioned parallel to the plastic sheet, very close thereto, e.g. spaced 1/16 of an inch away. Alternatively, for some applications the platen 50 may be flush with the clamp pressure surfaces which engage the die 42, or may extend slightly beyond those surfaces.

After the sealing clamp 46 has made full pressure engagement with the sealing die 42, the chamber defined by these two members is evacuated by means including a valve 60 which opens to connect a vacuum line 62 to passages 64 leading to the bottom spaces 66 of the die, to passages 68 leading to an evacuation aperture 70 in the cup, and to passages 72 leading to the spaces 74 above the package top. This latter connection (see FIG. 3) passes through a shut-off valve 76 and a T-junction the horizontal pipe of which connects to a normally-closed shut-off valve 78 leading to atmosphere.

By proper proportioning of the various vacuum passages, application of vacuum by valve 60 results initially in a more rapid reduction of pressure in spaces 74 above the package top than within the package. To insure rapid evacuation of spaces 74, one or more lateral grooves may be formed in the platen 50 to connect passage 72 to the side regions of the spaces. In any event, a significant differential pressure is developed across the top sheet 20, i.e. between the spaces above and below the sheet so that, as shown in FIG. 3, the plastic sheet is pressed up and into momentary contact with the platen 50, thereby to heat the plastic and soften it for stretching.

As the evacuation proceeds to completion, the pressures above and below the sheet 20 become equalized or nearly equalized, and the plastic sheet will tend to return to its horizontal position (as shown in FIG. 2).

After sufficient time has elapsed for the evacuation of the interior of the package to be completed through aperture 70, this aperture must then be closed off with a permanent seal in order to hermetically isolate the packaged articles from atmosphere. This is accomplished by a vertically-shiftable pressure bar 80 located within the sealing die 42, and mounted on actuator rods for sliding movement upwardly to force the plastic sheet material 20 against a recessed section 82 of the heated clamp 46. This pressure bar makes a rectangular seal surrounding the aperture 70 in the trailing flange of the cup. Thereafter the pressure bar drops back down to its normal position.

At the end of the evacuation cycle, the shut-off valve 76 and the shut-off valve 78 are actuated in sequence (by conventional cam means, not shown) so as to vent the spaces 74 above the package top. Shut-off valve 76 prevents any flow of air into the spaces beneath the package. The inrush of atmospheric pressure in spaces 74 forces the plastic sheet 20 downwardly, as shown in FIG. 4, by stretching the marginal portions of the plastic which were previously heated by the platen 50, and which are still sufficiently hot to permit proper stretching of the desired amount. The central face 84 of the top comes down into tight contact with the packaged articles, substantially across the full width of the cup.

Immediately after venting of the top spaces 74 above the package, the spaces beneath the package are vented by reactuation of the shut-off valve 76, as by conventional cam means, not shown. Thereafter, the sealing die 42 and the clamp 46 separate and the evacuated and sealed package is indexed to the next position. When the die and clamp are re-engaged on the next cycle, a further transverse seal line is placed across the trailing flange of the package, at a position 86 just inboard of the evacuation aperture and overlapping the aperture seal. Thus, when the completed package is cut from the following package by knife 88, there will be no loss of vacuum in the finished package.

Although a preferred embodiment of the invention has been described in detail, it is to be understood that this is for the purpose of illustrating the invention, and is not necessarily limiting thereof, since numerous changes can be made within the scope and spirit of the invention. For example, it may be desirable in some applications to heat the marginal portions of the sheet 20 just inboard of the seal line around the package flange to a substantially greater degree than the central face 84 of the top; such differential heating can be achieved in various ways, such as by using a platen 50 having a central area which is at a lower temperature, or which is recessed to avoid contact with the central face of the top. Such differential heating can be provided to a moderate extent by the flat platen arrangement of FIG. 2, as a result of the outboard locations of the heater elements 48. It is also possible to heat certain films 20 sufficiently by other means, such as by radiation alone from platen 50, or by contact therewith without the existence of differential pressure, to provide satisfactory forming.

What is claimed is:

1. The method of making a package of the type comprising a semi-rigid cup with a plastic top sealed thereto, the method being carried out by a machine of the single-chamber type comprising a first member providing a die having wall means the upper surfaces of which define first pressure surfaces; a second member arranged for relative movement towards and away from said die, said second member having means defining second pressure surfaces aligned with said first pressure surfaces and engageable therewith to form a single closed sealing and evacuation chamber within which the package may be completed by heat sealing said top to said container and simultaneously evacuating the package; and vacuum means communicating with the interior of the package when said two members are engaged to form said closed sealing and evacuation chamber;

said method comprising the steps of: placing in said die a cup-shaped container formed of semi-rigid form-retaining material having sealing surfaces extending around the mouth thereof; positioning over said container a sheet of heat-softenable plastic; moving said two members relatively together to form said closed chamber with said semi-rigid container sealing surfaces and said sheet of plastic gripped between said first and second pressure surfaces to seal said sheet to said container around the mouth thereof; evacuating said chamber and withdrawing the air from the package; applying heat to the marginal portions of said sheet immediately inboard of the seal line; completing the hermetic sealing of said package; and venting said chamber to outside atmosphere so as to stretch said heated marginal portions into the cup, thereby providing a central face portion which engages the upper surfaces of the packaged product so that the package volume matches that of the product.

2. The method of claim 1, wherein said heat is applied to said sheet by shifting the sheet in a direction away from said cup and into proximity to a heated element within said second member.

3. The method of claim 2, wherein said sheet is shifted by differential pressure created by reducing the pressure outside the sheet at a rate which is higher than the rate of reduction of pressure within the package.

4. The method of claim 3, wherein said heated element applies heat predominantly to said marginal sheet portions.

5. In packaging apparatus of the type comprising a first member providing a die adapted to receive a plastic cup-shaped container having sealing surfaces extending around the mouth thereof, said die including wall means the upper surfaces of which define first pressure surfaces; means to apply a continuous sheet of plastic material over each container to serve as a top for the package; a second member ararnged for relative movement towards and away from said die and cooperable therewith, said second member having clamp means defining second pressure surfaces aligned with said first pressure surfaces to grip said plastic sheet and said cup sealing surfaces therebetween and to form a single closed chamber within which the package may be completed by heat sealing said top to said container while simultaneously evacuating the package; and vacuum means communicating through at leat one of said members to the interior of said chamber to evacuate the package while said two members are engaged;

that improvement in such apparatus for making packages of the type wherein the cup is formed of semi-rigid, form-retaining plastic material and the plastic top includes, adjacent the seal line, stretched marginal portions extending into the cup to a central face portion which engages the upper surfaces of the packaged product so that the package volume matches that of the product; said improvement comprising:

heater means supported on said second member immediately adjacent said second pressure surfaces, said heater means being operable during evacuation of the package to apply heat to said marginal portions of the plastic top immediately inboard of said second pressure surfaces to soften the plastic in those marginal portions and render it readily stretchable, whereby, upon venting said chamber, atmospheric pressure forces the central portion of the plastic sheet inwardly against the product and said marginal portions are stretched substantially so as effectively to avoid the development of distorting stresses in the semi-rigid cup.

6. Apparatus as claimed in claim 5, wherein said heater means is connected in heat transfer relationship with said second pressure surfaces; and heat generating means communicating with said heater means and said second pressure surfaces to elevate the temperature of both.

7. Apparatus as claimed in claim 5, wherein said heater means is positioned closely above said sheet and spaced therefrom a small fraction of an inch.

8. Apparatus as claimed in claim 5, wherein said heater means includes heat generating means arranged to supply heat also to said second pressure surfaces.

9. The method of making a package comprising the steps of: placing a product in a cup-shaped container made of semi-rigid material and having sealing surfaces around the open mouth thereof; securing a plastic heat-softenable sheet to said sealing surfaces to serve as a package top; positioning a heated element adjacent the outer surface of said top; evacuating the interior of the package while simultaneously developing a differential pressure across said top to press the plastic sheet against said heated element and soften the plastic for subsequent stretching; completing the hermetic seal of subsequent stretching; completing the hermetic seal of the package; and stretching the heated top sheet into the semi-rigid container to engage the packaged product.

10. The method of claim 9, wherein said differential pressure is developed by reducing the pressure of the spaces above said top at a rate slightly greater than the rate of reduction of pressure within the package.

References Cited

UNITED STATES PATENTS

| 3,340,668 | 9/1967 | Bofinger | 53—22 |
|---|---|---|---|
| 3,353,325 | 11/1967 | Jensen et al. | 53—22 |

TRAVIS S. McGEHEE, Primary Examiner

U.S. Cl. X.R.

53—112, 141, 184

UNITED STATES PATENT OFFICE
CERTIFICATE OF CORRECTION

Patent No. 3,522,687          Dated August 4, 1970

Inventor(s)   Reid A. Mahaffy

It is certified that error appears in the above-identified patent and that said Letters Patent are hereby corrected as shown below:

Column 1, line 33, "stretching. Thereafter, the tray carrying the cup with" should read -- stretched inwardly into contact with the packaged articles --. Column 6, lines 40 and 41, cancel "completing the hermetic seal of subsequent stretching;".

Signed and sealed this 20th day of June 1972.

(SEAL)
Attest:

EDWARD M. FLETCHER, JR.
Attesting Officer

ROBERT GOTTSCHALK
Commissioner of Patents